United States Patent
Xiao et al.

(10) Patent No.: US 10,572,536 B2
(45) Date of Patent: Feb. 25, 2020

(54) DETERMINING RATE OF VIDEO FEED STORIES IN A FEED PROVIDED TO USERS

(71) Applicant: Facebook, Inc., Menlo Park, CA (US)

(72) Inventors: Zigang Xiao, Fremont, CA (US); Jie Xu, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 423 days.

(21) Appl. No.: 15/662,211

(22) Filed: Jul. 27, 2017

(65) Prior Publication Data

US 2019/0034438 A1 Jan. 31, 2019

(51) Int. Cl.
*G06F 16/00* (2019.01)
*G06F 16/783* (2019.01)
*G06F 16/78* (2019.01)
*G06F 16/9535* (2019.01)

(52) U.S. Cl.
CPC .......... *G06F 16/7837* (2019.01); *G06F 16/78* (2019.01); *G06F 16/9535* (2019.01)

(58) Field of Classification Search
CPC ... G06F 16/7837; G06F 16/9535; G06F 16/78
See application file for complete search history.

(56) References Cited

U.S. PATENT DOCUMENTS

| | | | | |
|---|---|---|---|---|
| 8,930,204 B1* | 1/2015 | Igoe | ....................... | G06Q 30/02 705/2 |
| 10,127,632 B1* | 11/2018 | Burke | ................... | G06T 3/4038 |
| 2008/0242279 A1* | 10/2008 | Ramer | ................... | G06Q 30/02 455/414.2 |
| 2010/0312724 A1* | 12/2010 | Pinckney | ............... | G06Q 30/02 706/11 |
| 2013/0073387 A1* | 3/2013 | Heath | .................... | G06Q 50/01 705/14.53 |
| 2013/0110978 A1* | 5/2013 | Gordon | .............. | H04N 21/2665 709/218 |
| 2014/0013200 A1* | 1/2014 | White | .................. | H04N 21/235 715/230 |
| 2014/0129625 A1* | 5/2014 | Haugen | ................... | H04W 4/08 709/204 |
| 2017/0132250 A1* | 5/2017 | Merler | .................... | H04N 21/00 |
| 2018/0246973 A1* | 8/2018 | Zhao | ................... | G06F 16/9535 |
| 2018/0253496 A1* | 9/2018 | Natchu | ................. | G06F 16/951 |
| 2019/0230186 A1* | 7/2019 | Yellin | ................. | G06F 9/44505 |
| 2019/0361577 A1* | 11/2019 | Burns | ................. | H04L 65/4069 |

\* cited by examiner

*Primary Examiner* — Leslie Wong
(74) *Attorney, Agent, or Firm* — Fenwick & West LLP

(57) ABSTRACT

A social networking system provides feed to users in response to requests from users. The feed includes feed stories that include one or more of text, image, or videos. The social networking system generates a feed in which the number of video feed stories is determined based on the video feed story rate determined for each specific request. The social networking system determines the video feed story rate based on various features including features describing the request, for example, the time of the day that the request is received. The social networking system may include other features for determining the video feed story rate, for example, user specific features describing the user that sent the request. The social networking system sends the generated feed to the client device of the target user.

20 Claims, 5 Drawing Sheets

DETERMINING RATE OF VIDEO FEED STORIES IN A FEED PROVIDED TO USERS

BACKGROUND

This invention relates to including videos in a feed sent to client devices of users by a social networking system and, in particular, to determining a rate at which videos are included in the feed sent to client devices of users by the social networking system.

Social networking systems receive content from content providers, as well as users of the social networking system, and provide the content to users. For example, content may be provided in the form of a feed to users. A feed can include feed stories that can include text, images, or videos. If a social networking system provides content to a user and the user is not interested in the content, the social networking system wastes resources such as network bandwidth. Furthermore, the social networking system provides poor user experience. For example, a user may prefer to watch videos in a feed in certain contexts and avoid watching videos in other contexts. Similarly, a particular user may prefer to watch content of a particular type in a given context whereas a different user may avoid content of the same type in that context. Conventional techniques for providing content items to users typically use broad targeting criteria for identifying content sent to users. For example the targeting criteria may be based on user demographics. Conventional techniques based on broad targeting criteria often provide content to users that they may not be interested in, thereby wasting resources and providing poor user experience.

SUMMARY

A social networking system provides feed to users in response to requests from users. The feed comprises feed stories that comprise one or more of text, image, or videos. A video feed story represents a feed story with a video. The social networking system determines a video feed story rate representing a rate at which video feed stories are included the feed for a particular user. The social networking system determines a video feed story rate for each specific user request and includes video feed stories in the feed based on the video feed story rate. Accordingly, the rate at which video feed stories are included in a feed provided in response to a request depend on features describing the request, for example, the time of day at which the request was sent. Users of a social networking system are more likely to view videos in their feed in certain contexts and less likely to view videos in their feed in other contexts. For example, a user may access a feed while waiting for a meeting to start but is less likely to watch videos in this context. The same user accessing the feed from home in the evening is more likely to watch videos in the feed.

In an embodiment, the social networking system uses a machine learning based model to determine a video feed story rate. The social networking system extracts a feature vector for providing as input to the model. In various embodiments, the feature vector includes features describing the user request, for example, the time of day of the request, features describing the client device used to send the request, features describing the user profile of the user, and so on. The social networking system generates a feed in which the number of video feed stories is determined based on the video feed story rate determined by executing the model. The social networking system sends the generated feed to the client device of the target user.

Figure 1:
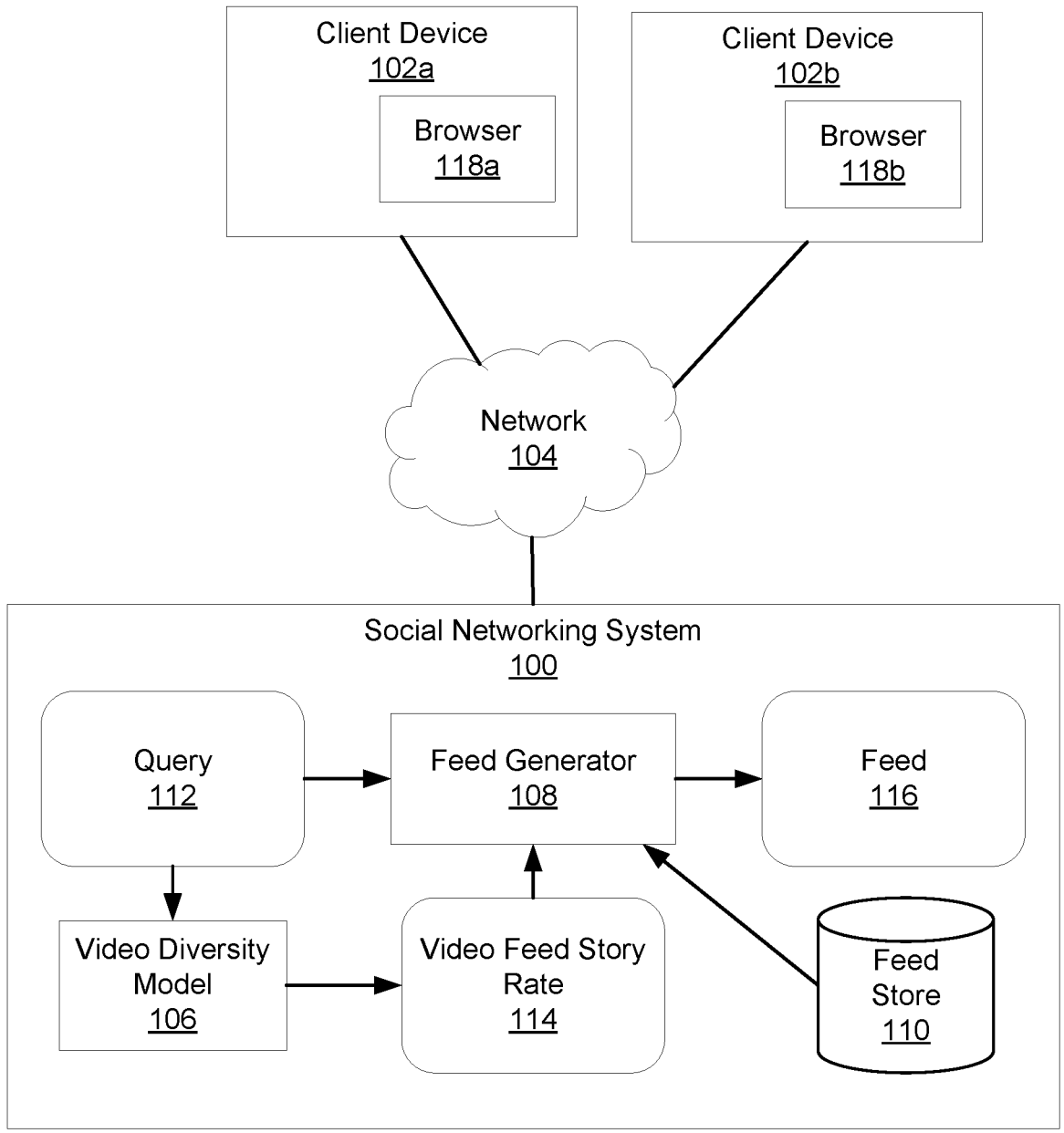
FIG. 1 is a diagram of a system environment for generating a feed for users of a social networking system, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A feed is a set of feed stories provided to a user during a given session of the user with the social networking system. Feed stories contain social information of interest to a user. A feed may include one or more feed stories that include videos. These are referred to as "video feed stories." A session may comprise one or more requests from a user for a feed. A request for a feed may also be referred to herein as a "query." During a session, a user may send a query via a client device, for example, when a user connects to the social networking system via a client application. Additionally, the user may send subsequent queries by continuing to scroll through the feed.

In some embodiments, a social networking system enforces a video diversity policy that limits the number of videos included in a feed to within a threshold value. Accordingly, the video diversity policy corresponds to a threshold rate at which video feed stories are included in a feed. The rate at which video feed stories are included in a feed is also referred to herein as a "video feed story rate" for a given feed. The video feed story rate may represent a percentage of video feed stories in a given feed with a particular number of feed stories.

System Overview

FIG. 1A is a diagram of a system environment for generating a feed 116 for users of a social networking system 100, according to one embodiment. Users' client devices 102 interact with the social networking system 100 via a network 104 to request and receive feed stories. A client device 102 includes a client application, for example, a browser 118. The social networking system 100 includes a video diversity model 106, a feed generator 108, a feed store 110, a query 112, a video feed story rate 114, and a feed 116. Some embodiments of the social networking system 100 have different and/or other modules than the ones described herein. The functions can be distributed among the modules in a different manner than described in FIG. 1A.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a" and/or "102b" in the figures).

The user client devices 102 allow users to communicate and interact via the network 104 with the social networking system 100. Specifically, the client devices 102 transmit and receive data from the social networking system 100 relating to feed stories. The data may be queries 112 or generated feeds 116. The client devices 102 are computing systems capable of receiving user input as well as transmitting and/or receiving data via the network 104. The client devices 102 may contain location sensors that detect the geographical location of the device, such as a global positioning system (GPS). The client devices 102 may also run applications and/or browsers 118, 119 that allow the client devices 102 to specifically communicate with the social networking system 100. Examples of client devices 102 include desktops, laptops, smartphones, tablets, etc.

The interactions between client devices 102 and the social networking system 100 are typically performed via a network 104, for example, via the internet. The network 104 enables communications between the client devices 102 and the social networking system 100. In one embodiment, the network 104 uses standard communications technologies and/or protocols. The data exchanged over the network 104 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 104 can also include links to other networks such as the Internet.

The social networking system 100 allows users to communicate or otherwise interact with each other and access content. To do this, the social networking system 100 generates one or more feeds 116 in response to one or more queries 112 sent from client devices 102, and sends the feeds 116 to the client devices 102 associated with the queries 112. The social networking system 100 may perform other actions and include other modules, some of which are described in FIG. 3.

The query 112 is a request from a client device 102 for a feed 116 from the social networking system 100. The query 112 is received by the social networking system 100 and provided to the video diversity model 106 and feed generator 108, among other possible modules, to be received and analyzed. Associated with each query 112 are features that describe the query 112, the user associated the query 112, and the social networking system 100. These features are determined by the feature extraction module 320 (described with reference to FIG. 3), and are referred to as "extracted features." The extracted features may include, among other extracted features, user level features, query level features, features describing the client device, and features describing available feed stories. Examples of user level features include user demographics, such as age, sex, language, ethnicity, and so on. Examples of query level features include time of day that the request was received, location of the client device sending the request (for example, work location vs. home location). Examples of features describing the client device include a type of client device, for example, if the client device is a mobile device, type of client application used to send the request, for example, a mobile application or a web browser. Examples of features describing available feed stories include a number of video feed stories available for the user at the time of the request, a total number of feed stories available for the user at the time of the request, and so on.

Upon receiving the query 112, the video diversity model 106 determines the video feed story rate 114. The video feed story rate 114 is a rate at which video feed stories are included in a particular feed 116 provided to the client device 102 of the user. The feed generator 108 limits the number of video feed stories to a threshold value based on the video feed story rate. In an embodiment the video diversity model 106 determines the number of video feed stories that are provided consecutively in the feed 116 based on the video feed story rate.

The video diversity model 106 determines the video feed story rate 114 based on the extracted features. Specifically, the video diversity model 106 receives a feature vector characterizing the extracted features (including, at least a feature specifying the time of the received query 112). In an embodiment, the video diversity model 106 determines a weighted aggregate value representing the video feed story rate 114 based on a feature vector. In an embodiment, the video diversity model 106 is configured to determine a likelihood of the user watching videos in a feed 116 in response to the received query 112. Accordingly, upon receiving a query 112, the video diversity model 106 determines a score indicating a likelihood of the user watching videos in a feed 116 provided in response to the query 112. The video diversity model 106 determines the video feed story rate 114 based upon the score indicating the likelihood of the user watching videos in the feed 116 provided in response to the query 112.

The feed generator 108 generates a feed 116 in response to the received query 112. Specifically, upon receiving the query 112 and the video feed story rate 114, the feed generator 108 selects a set of feed stories from the feed store 110 to generate a feed 116 including a number of video feed stories determined by the video feed story rate 114. Upon generating the feed 116, the feed generator 108 sends the generated feed 116 to the client device 102 that sent the query 112.

The feed store 110 stores feed stories for generating a feed 116. In an embodiment, the story generator 300 (described with reference to FIG. 3) generates feed stories and stores the feed stories in the feed store 110. The feed store 110 may also store feed stories from external content providers or other users. In addition to storing feed stories, the feed store 110 may link various objects related to the stories. Each feed story stored in the feed store 110 may be associated with other entities in the social networking system 100. For example, the feed store 110 may include a feed story associated with one or more users that performed an action described in the feed story in the social networking system 100. For example, if the feed story describes a comment posted by Dean on a video posted by Woodie, both Dean and Woodie can be associated to the feed story, and these relations are recorded in the feed store 110.

The feed 116 is a set of feed stories provided to a user via the user's client device 102 during a given session of the user with the social networking system 100. The feed 116 is generated by the feed generator 108 and includes feed stories stored in the feed store 110. The feed 116 may contain a set of feed stories for each query 112. The feed 116 is generated according to a video feed story rate 114, and may be different for every received query 112. Examples of feeds 116 generated according to different video feed story rates 114 may be seen in FIG. 2.

Example Feeds

Figure 2:
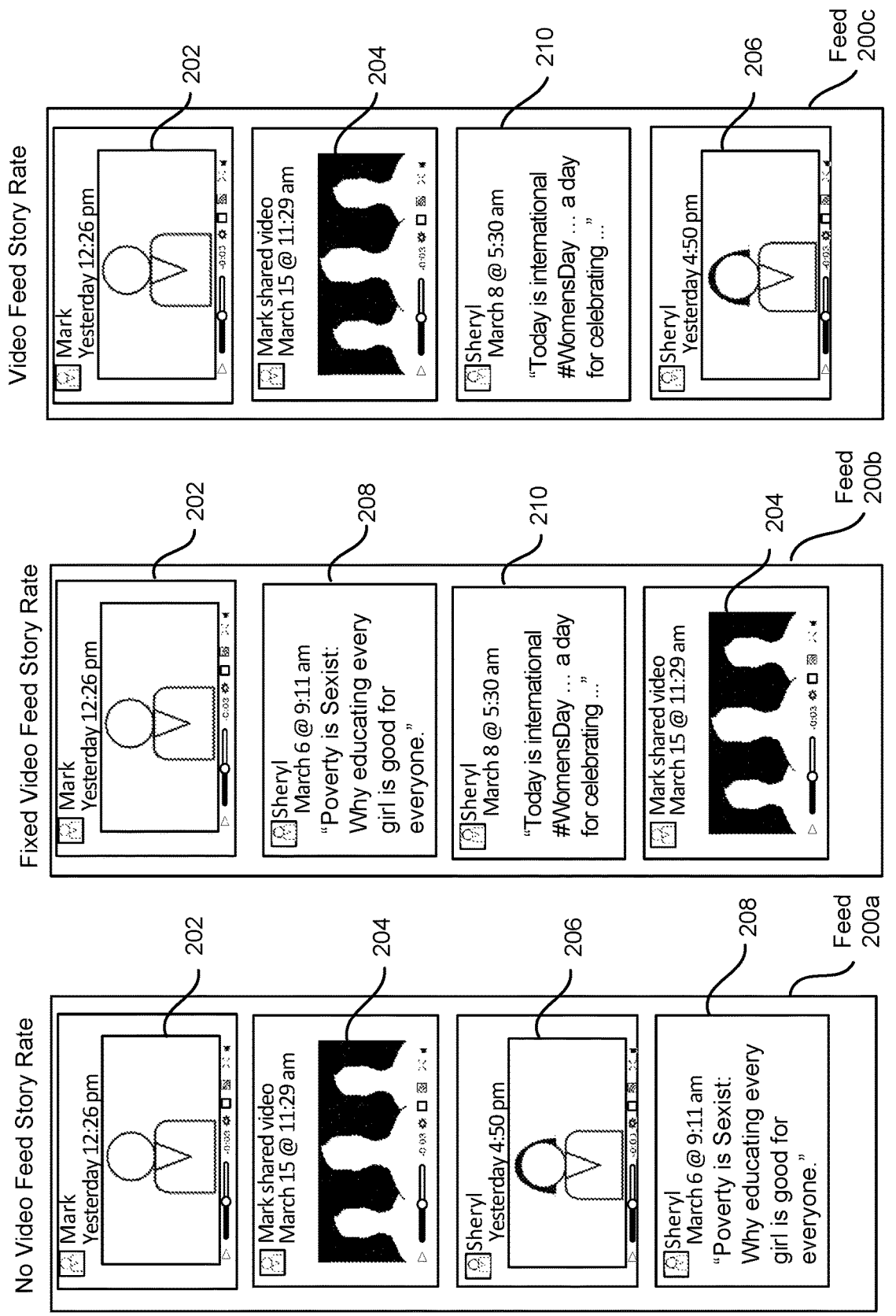
FIG. 2 illustrates example feeds generated by the social networking system, according to one embodiment.

FIG. 2 illustrates example feeds 200 generated by the social networking system 100, according to one embodiment. Each feed 200a-200c was generated by the feed generator 108 according to a different video diversity policy. The feeds 200a-200c include video feed stories 202, 204, 206 and non-video feed stories 208, 210. The feeds 200a-200c may include more or fewer feed stories.

Feed 200a is an example generated feed 116 that is generated with a video diversity policy that does not specify any video feed story rate 114. As a result, the feed generator 108 creates a feed 200a with feed stories in an arbitrary order. For example, the feed 200a contains three consecutive video feed stories 202, 204, 206 followed by a non-video feed story 208. As a result, the user may receive a feed 200a that may not be interesting for the user. For example, a user's client device may receive a feed 116 only containing video feed stories or only non-video feed stories.

Feed 200b is an example generated feed 116 that is generated with a video diversity policy that specifies a fixed video feed story rate 114. A fixed feed story rate 114 is a constant that limits the number of videos included in a feed 116 to a fixed threshold value. For example, the social networking system 100 generates feeds 116 according to a universal fixed video feed story rate 114. Accordingly, the number of video feed stories included in the feed 200b is independent of the context in which the request is received. The fixed video feed story rate 114 may limit the number of video feed stories that are consecutive in the feed 200b. However, the feed 200b is generated without considering the context of a particular query. For example, if a user is at work and unable to listen to the audio of a video in a video feed story (e.g., in a meeting) then the video feed stories 202, 204 may be uninteresting to the user.

Feed 200c is an example generated feed 116 that is generated with a video diversity policy that adaptively determines a video feed story rate 114 based on a context of the query. The feed story rate 114, determined by the video diversity model 106, is the rate at which video feed stories are included in a feed and varies according to the context of the query. Accordingly, the video diversity model 106 increases or decreases the video feed story rate 114 based upon features extracted from the query 112 or other factors.

The feed stories 202, 204, 206, 208, 210 are stored in the feed store 110 and contain social information of interest to a user of a client device 102. A feed story may contain images, text, and videos. The feed stories may contain content received from external content providers or from other users. Video feed stories 202, 204, 206 contain at least one video and may contain text and/or images. Non-video feed stories 208, 210 do not include videos, but may include text and/or images.

Social Networking System

Figure 3:
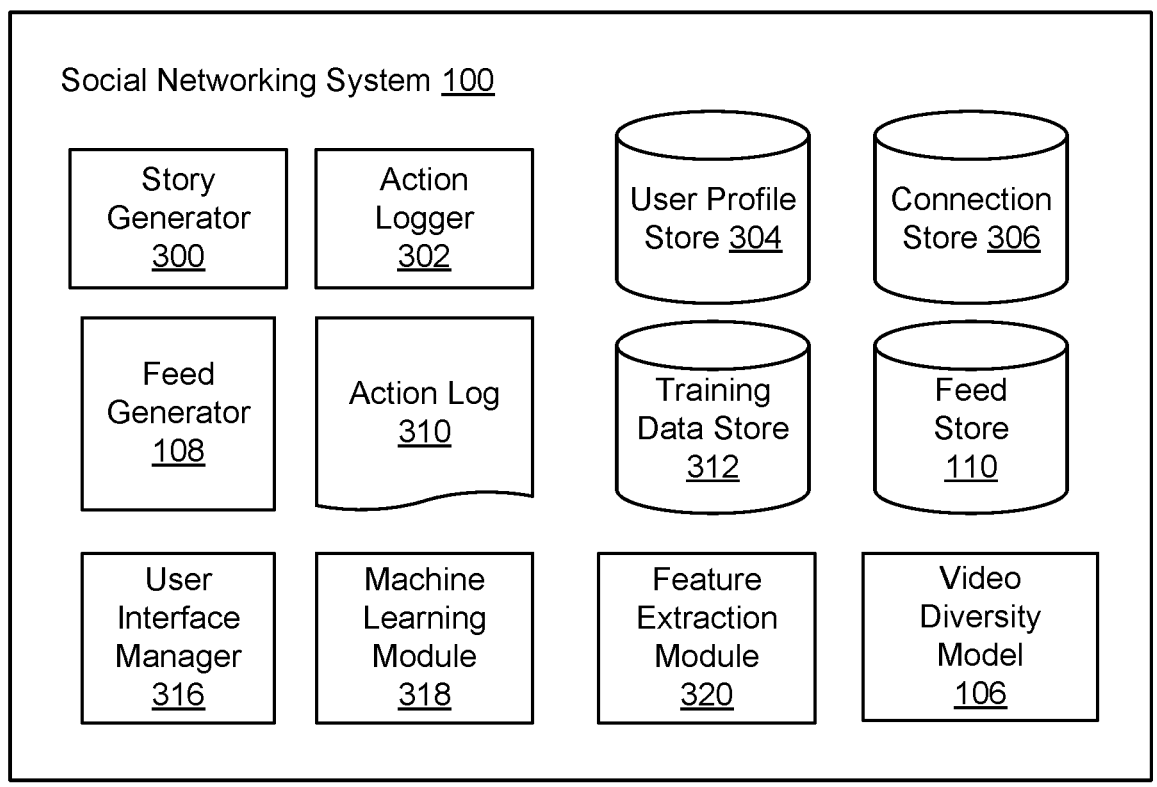
FIG. 3 is a diagram of the system architecture of the social networking system, according to one embodiment.

FIG. 3 is a diagram of the system architecture of the social networking system 100 within the environment of FIG. 1, according to one embodiment. The social networking system 100 includes, among other components, a story generator 300, an action logger 302, user profile store 304, connection store 306, action log 310, training data store 312, user interface manager 316, machine learning module 318, feature extraction module 320, feed store 110, video diversity model 106, and feed generator 108. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The user interface manager 316 allows users of the social networking system 100 to interact with the social networking system 100 and presents social information of interest to a user. For example, the user interface manager 316 may present an interface to a client device 102 (to be rendered by a browser 118) that includes a feed 116 that contains feed stories from the feed store 110. The feed 116 may contain video feed stories according to a video feed story rate 114 determined by the video diversity model 106.

The social networking system 100 stores user profile objects in the user profile store 304. The information stored in user profile store 304 describes the users of the social networking system 100, including biographic, demographic, and other types of descriptive information, such as age, work experience, educational history, interests, gender, sexual preferences, hobbies or preferences, location, income, languages spoken, ethnic background, and the like. Information describing a user may be explicitly provided by a user or may be inferred from actions of the user. For example, interests of a user can be inferred from the type of content accessed by the user. The user profile store 304 may store other types of information provided by the user, for example, images, videos, documents, likes indicated by the user, comments, status updates, recommendations of images, videos, or uniform resource locator (URL) links, and the likes. Images of users may be tagged with the identification information of the appropriate users displayed in an image.

The connection store 306 stores data describing the connections between different users of the social networking system 100. The connections are defined by users, allowing users to specify their relationships with other users. For example, the connections allow users to generate relationships with other users that parallel the users' real-life relationships, such as friends, co-workers, partners, and so forth. In some embodiments, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking system 100 based on common characteristics of the users (e.g., users who are alumni of the same educational institution). Connections in social networking system 100 are usually in both directions, but need not be, so the terms "connection" and "friend" depend on the frame of reference. For example, if Dean and Woodie are both connected to each other in the social networking system 100, Dean and Woodie, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

The action logger 302 is capable of receiving communications about user actions on and/or off the social networking system 100. The action logger 302 populates the action log 310 with information about user actions to track them.

When a user performs an action using the social networking system 100, the action logger 302 adds an entry for that action to the action log 310. Any action that a particular user takes with respect to another user is associated with each user's profile, through information maintained in a database or other data repository, such as the action log 310. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well.

The story generator 300 generates feed stories for presentation to users of the social networking system 100. In an embodiment, the story generator 300 analyzes information stored in the action log 310, user profile store 304, and connection store 306 to identify information useful for generating feed stories. This information includes text, images, and videos. The story generator 300 identifies actions stored in the action log 310 that are likely to be of interest to viewers and extracts information describing these actions from the action log 310, user profile store 304, and/or connection store 306 to generate stories. In some embodiments, the story generator 300 obtains information describing actions from other modules, for example, from the action logger 302, the user interface manager 316, external content providers, and/or other run time modules that implement functionality for performing different types of actions. For example, if a user uploads an image to the social networking system 100, the module executing the code for uploading the image informs the story generator 300 of the action so that the story generator 300 can generate a feed story describing the action.

The feed store 110 stores feed stories generated by the story generator 300. The feed store 110 may also link various objects related to the stories. Each feed story stored in the feed store 110 can be associated with other entities in the social networking system 100. For example, a feed story may be associated with one or more users that performed an action described in the feed story in the social networking system 100. For example, if the feed story describes a comment posted by Dean on a video posted by Woodie, both Dean and Woodie can be associated with the feed story. As another example, a story describing a comment posted by a user in response to another user's wall post may be associated with both the user who posted the message on the wall and the user who posted the comment.

The feed generator 108, determines the feed stories to be presented to a user and provides the stories selected for presentation to the user interface manager 316. The user interface manager 316 presents the selected feed stories to the browser 118, 119 on a client device 102. In response to a query 112, the feed generator 108 determines a set of feed stories for presentation to the user based on associations between the feed stories and the user. These associations are determined based on various factors including, whether the feed story describes a user of the social networking system 100 that is connected to the user, whether the user previously accessed information describing an entity represented in the social networking system 100 that is described in the feed story, whether the user interacted with another feed story that is related to the current feed story, and the like. This information may be found in the action log 310, user profile store 304, connection store 306, and/or the feed store 110. The feed generator 108 may also select video feed stories based on the video feed story rate 114 received from the video diversity model 106. In another embodiment, after the feed stories have been selected, the feed generator 108 determines the order of the feed stories according to the video feed story rate 114. In another embodiment, if the feed stories are ordered according to a ranking (e.g., relevance to the user), then the ranking is adjusted to account for the video feed story rate 114.

The video diversity model 106 accepts the extracted features as input and determines the video feed story rate 114. Upon receiving the query 112, the video diversity model 106 receives the extracted features from the feature extraction module 320, and determines a video feed story rate 114 for the received query 112. The video diversity model 106 determines a score indicative of a likelihood of a user watching videos in a feed 116 based on extracted feature scores, each extracted feature score representing a value of an extracted feature.

In an embodiment, the video diversity model 106 comprises weights for feature scores corresponding to various features extracted by the feature extraction module 320 and instructions for determining a weighted aggregate value based on the weights and a feature vector. The video diversity model 106 determines the video feed story rate 114 as a weighted aggregate value of feature scores. The weights are predetermined constant values or configurable values. The weights may be provided by a user, for example, an expert user who has domain knowledge for determining weights of various extracted features.

In another embodiment, the video diversity model 106 is a machine learning based model trained by the machine learning module 318. The video diversity model 106 may be a tree-based model, a model based on kernel methods, neural networks, splines, or an ensemble of one or more of these techniques. In this embodiment, the machine learning module 318 may determine weights of various extracted features based on training data in the training data store 312. In this embodiment, the machine learning module 318 may use the content from the training data store 312 and extracted features from the feature extraction module 320 to train the video diversity model 106. For example, the video diversity model 106 may be trained using positive and negative examples from historical data stored in the training data store 312. After the video diversity model 106 is trained, the weights associated with various extracted features are stored. Based upon new data added to the historical data, the video diversity model 106 may be retrained. Upon receiving a query 112, the video diversity model 106 determines a video feed story rate 114 for the query 112.

The training data store 312 contains historical data used by the machine learning module 320 to train the video diversity model 106. The historical data includes past queries 112, extracted features of each query, feed stories presented to the user in response to the query 112, and the user's response to the feed stories. The historical data may be divided into two groups, positive and negative samples. A positive example includes a past query 112 for which a video feed story was included in the feed 116 and the user accessed the video feed story. A negative example includes a past query 112 for which a video feed story was included in the feed 116 and the user did not access the video feed story.

The feature extraction module 320 determines the extracted features associated with the received query 112 and provides the extracted features to the video diversity model 106. Additionally, the feature extraction module 320 extracts features relating to past queries 112 and stores them in the training data store 312. The extracted features may include features describing the query 112.

A feature may describe the time of day that the query 112 was received by the social networking system 100 or sent from the client device 102. A user may prefer to watch more videos in a feed 116 at a particular time of day and may prefer to watch less videos in a feed 116 at another time of day. For example, the user may prefer to watch videos in a feed 116 during evening but may avoid watching videos in a feed 116 during day time.

A feature may describe the day of the week, month, and/or year that the query 112 was received by the social networking system 100 or sent from the client device 102. A user may prefer to watch more videos in a feed 116 on particular days and may prefer to watch less videos in a feed 116 on other days. For example, a user watches more videos in a feed 116 on weekends and less during weekdays.

A feature may describe the type of client device 102 that sent the query 112. A user may prefer to watch more videos in a feed 116 on certain client devices 102 (e.g., not mobile, personal computer, etc.) but prefer to watch less videos in a feed 116 on other client devices 102 (e.g., mobile, smartphone, tablet, etc.).

A feature may describe the location of the client device 102 of the user. The social networking system 100 may detect the location of the client device 102, for example, based on a GPS device of the client device 102. A user may prefer to watch more videos in a feed 116 at certain locations but prefer to watch less videos in a feed 116 in other locations. For example, a user may watch more videos in a feed 116 at home compared to work.

A feature may describe the quality of the network 104 connection between the social networking system 100 and the client device 102 that sent the query 112. If network access is slow at the client device 102, a user may prefer to watch fewer videos in a feed 116.

A feature may describe the application used to send the query 112. A user may prefer to watch more videos in a feed 116 using a particular application (e.g., mobile application) but prefer to watch less videos in a feed 116 using another application (e.g., browser).

In an embodiment, the feature extraction module 320 extracts features describing the user. These include user profile attributes stored in the user profile store 304, for example, age, gender, language, ethnicity, etc. Additionally, a user may have an affinity for watching videos in a feed 116 dependent upon the number of previously watched videos in a feed 116. For example, a user may prefer to watch more or less videos in a feed 116 after consuming a certain number of videos in a feed 116.

The extracted features may also include features describing the inventory of feed stories available in the feed store 110 for the user at the time the query 112 was received from the user. For example, a feature may describe a number of available of video feed stories for the user. The social networking system 100 may add more or less video feed stories depending on the availability of video feed stories in the feed store 110. For example, if the feed store 110 contains a high number of video feed stories, the social networking system 100 may display more videos in a feed 116 compared to a low number of video feed stories available in the feed store 110.

Process for Training the Model

Figure 4:
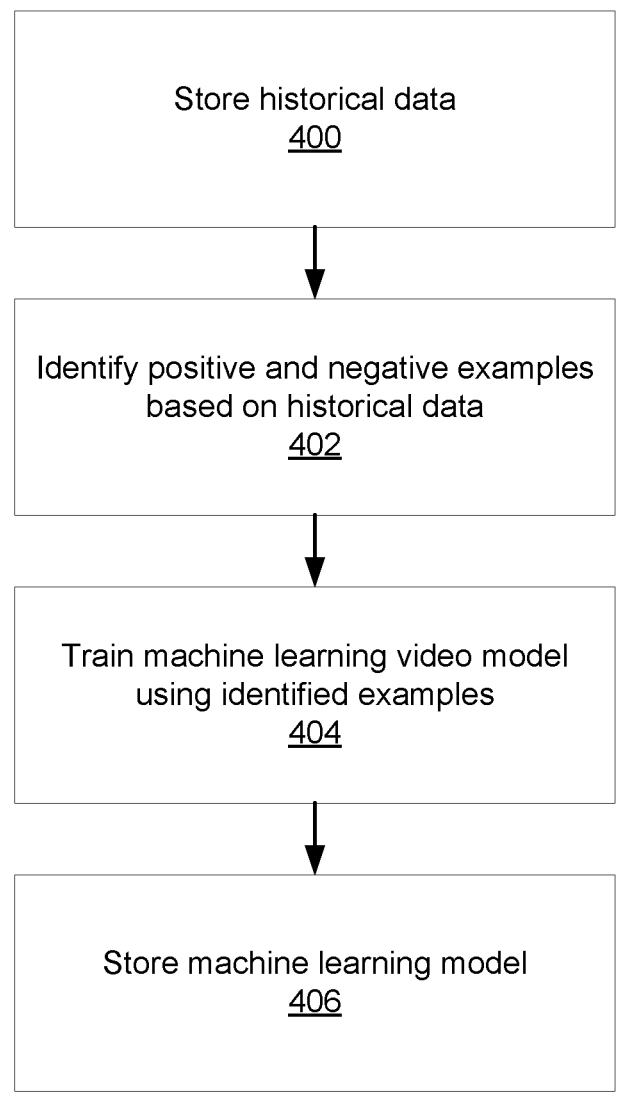
FIG. 4 is a flowchart of the process for training the video diversity model used for determining a rate of including video feed stories in a feed, according to one embodiment.

FIG. 4 is a flowchart of the process for training the video diversity model 106 using machine learning techniques, according to one embodiment. The process may include different or additional steps than those described in conjunction with FIG. 4. The process may perform steps in different orders than the order described in conjunction with FIG. 4.

The video diversity model 106 is trained by the machine learning module 318 to determine a video feed story rate 114 for a given query 112, using a set of historical data. In an embodiment, the video diversity model 106 is trained for each user and may change over time if a user's video viewing preferences change. In other embodiments, the video diversity model 106 receives user specific extracted features describing the user profile of the user. The video diversity model 106 determines the video feed story rate 114 based on query specific extracted features as well as user specific extracted features. The historical data is stored 400 in the training data store 312. The historical data includes past queries 112, extracted features determined by the feature extraction module 320, feed stories included in feeds 116 sent to the target user in response to the request, and user interactions (or the lack thereof) with the video feed stories.

The machine learning module 318 identifies 402 positive and negative examples to train the video diversity model 106. In some embodiments, after an example is identified as positive or negative, the identification is stored in the training data store 312 for the machine learning module 318. A positive example includes a past query 112 for which a video feed story was included in the feed 116 and the user accessed the video feed story. For example, the user watches a video in a video feed story, likes the video, comments on the video, recommends the video, and so on. A negative example includes a past query 112 for which one or more video feed stories were included in the feed 116 and the user did not access any of the video feed stories. For example, the user did not watch any of the videos in the feed 116 or perform any other interaction, for example, liking the video, commenting on the video, recommending the video and so on. In some embodiments, a negative example includes a past query 112 for which a user does not access a threshold number of video feed stories in a feed 116.

The machine learning module 318 trains 404 the video diversity model 106 using machine learning techniques, using the previously identified examples. Specifically, the video diversity model 106 is configured to determine a video feed story rate 114 for a received query 112. In some embodiments, the machine learning module 318 determines a feature vector for each set of extracted features associated with a query 112, and uses the feature vectors associated with each identified example to train the video diversity model 106.

The machine learned video diversity model 106 is stored 406 for future use. The video diversity model 106 comprises the specific weights for extracted features input to the video diversity model 106 that are obtained as a result of training. In response to a new query 112, the video diversity model 106 determines the video feed story rate 114 for the new query 112. The process of FIG. 4 may be repeated any number of times.

Process for Generating Feed Using the Model

Figure 5:
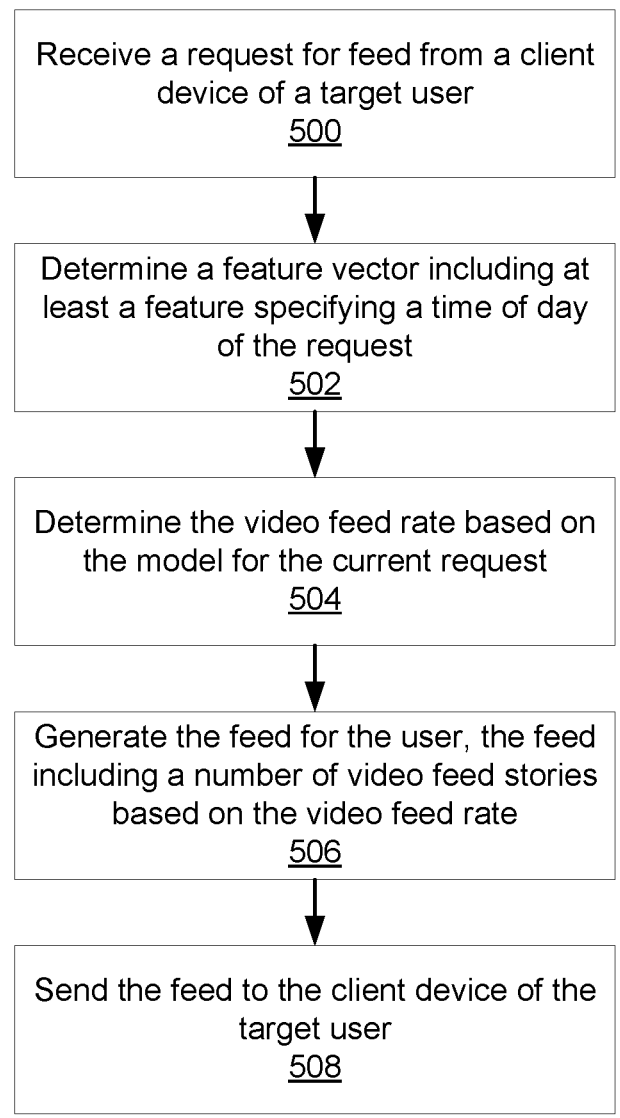
FIG. 5 is a flowchart of the process for generating a feed based on the video diversity model trained as illustrated in FIG. 4, according to one embodiment.

FIG. 5 is a flowchart of the process for generating a feed 116, according to one embodiment. The process may include different or additional steps than those described in conjunction with FIG. 5. The process may perform steps in different orders than the order described in conjunction with FIG. 5.

The social networking system 100 receives 500 a query 112 from a client device 102 of a target user. In some embodiments, the social networking system 100 receives many queries 112 from a single or multiple client devices 102, each query is associated with a single user. A query 112 is a request for a feed 116. A feed 116 is a set of feed stories provided to a user. Feed stories contain social information of interest to a user. Specifically, each feed story may contain text, images, and/or videos. The video feed stories include one or more videos, while non-video feed stories do not include a video.

The video diversity model 106 is configured to determine a video story feed rate 114 that indicates a number of videos to be included in a feed 116 that is provided to the client device 102 of the user. The feature extraction module 320 determines 502 a feature vector comprising features associated with the query 112 and provides the feature vector to the video diversity model 106. The feature vector may be a vector that quantifies each extracted feature as a number in a vector component. The extracted features include, at least, the time of day of the request. The time of day of the request may describe the time that the query 112 is received by the social networking system 100 or the time that the query 112 was sent from the client device 102.

The video diversity model 106 determines 504 the video feed story rate 114 for the current query 112 based on the feature vector comprising the various features extracted by the feature extraction module 320. The video feed story rate 114 is a rate at which video feed stories are included in a particular feed 116 provided to the client device 102 of the user. The video feed story rate 114 may also limit the number of video feed stories to a threshold value, vary with the extracted features, and/or limit the number of video feed stories that are consecutive in the feed 116. The video feed story rate 114 may reflect a likelihood of a user accessing videos in a feed 116.

The feed generator 108 generates 506 a feed 116 for the user, the feed 116 including a number of video feed stories based on the video feed story rate 114. In some embodiments, one or more feeds 116 are generated in response to a single query 112. The feed stories in the feed 116 are pulled from the feed store 110.

The social networking system 100 sends 508 the feed 116 to the client device 102 of the target user. The process of FIG. 5 may be repeated any number of times.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving a request for feed from a client device of a target user, wherein a feed represents a sequence of feed stories, each feed story comprising one or more of text, image, or video, wherein a video feed story represents a feed story with a video;
    determining a feature vector comprising at least a feature specifying a time of day of the request;
    providing the feature vector as input to a model configured to determine a video feed story rate indicating a rate at which video feed stories are included in a particular feed provided to the client device of the target user;
    determining the video feed story rate for the received request based on the model;
    generating a feed in response to the received request, the generating comprising selecting a set of feed stories for including in the generated feed, wherein the number of video feed stories included in the set of feed stories is determined based on the video feed story rate; and
    sending the generated feed to the client device of the target user.

2. The computer-implemented method of claim 1, wherein the model is a machine learning model.

3. The computer-implemented method of claim 2, further comprising:
    storing past requests for feed stories and feed sent to the target user in response to the requests, the feed stories including videos and the user interactions with the videos;
    identifying positive and negative examples based on the past requests; and training a machine learning model using the positive and negative examples.

4. The computer-implemented method of claim 3, wherein a positive example represents a past request and feed provided in response to the request, wherein the feed comprises at least a video feed story that was accessed by the user.

5. The computer-implemented method of claim 3, wherein a negative example represents a past request and feed provided in response to the request, wherein the feed comprises one or more video feed stories that were not accessed by the user.

6. The computer-implemented method of claim 1, wherein the request is a first request, the feature vector is a first feature vector, the video feed story rate is the first video feed story rate, and the feed is the first feed, the method further comprising:
receiving a second request for feed from the client device of the target user;
determining a second feature vector comprising a feature specifying a time of day of the request;
providing the second feature vector to the model;
executing the model to determine a second video feed story rate for the second request;
generating a second feed in response to the second request, the generating comprising selecting a second set of feed stories for including in the generated feed, wherein the number of video feed stories included in the second set of feed stories is determined based on the second video feed story rate; and
sending the second feed to the client device of the target user.

7. The computer-implemented method of claim 1, wherein the feature vector further comprises one or more features describing demographic attributes stored in the user profile of the user.

8. The computer-implemented method of claim 7, wherein a demographic attribute is one of: age of the user, gender of the user, or a language associated with the user.

9. The computer-implemented method of claim 1, wherein the feature vector further comprises one or more features describing a type of the client device.

10. The computer-implemented method of claim 1, wherein the feature vector further comprises a feature identifying a client application of the client device used to send the request.

11. The computer-implemented method of claim 1, wherein the feature vector further comprises a feature describing a location of the client device.

12. The computer-implemented method of claim 1, wherein the feature vector further comprises a feature representing an estimate of a number of video feed stories that have not been provided to the user.

13. A non-transitory computer-readable storage medium comprising stored instructions for:
receiving a request for feed from a client device of a target user, wherein a feed represents a sequence of feed stories, each feed story comprising one or more of text, image, or video, wherein a video feed story represents a feed story with a video;
determining a feature vector comprising at least a feature specifying a time of day of the request;
providing the feature vector as input to a model configured to determine a video feed story rate indicating a rate at which video feed stories are included in a particular feed provided to the client device of the target user;
executing the model to determine the video feed story rate for the received request;
generating a feed in response to the received request, the generating comprising selecting a set of feed stories for including in the generated feed, wherein the number of video feed stories included in the set of feed stories is determined based on the video feed story rate; and
sending the generated feed to the client device of the target user.

14. The non-transitory computer-readable storage medium of claim 13, wherein the model is a machine learning model, wherein the stored instructions are further for:
storing past requests for feed stories and feed sent to the target user in response to the requests, the feed stories including videos and the user interactions with the videos;
identifying positive and negative examples based on the past requests; and
training a machine learning model using the positive and negative examples.

15. The non-transitory computer-readable storage medium of claim 13, wherein the request is a first request, the feature vector is a first feature vector, the video feed story rate is the first video feed story rate, and the feed is the first feed, wherein the stored instructions are further for:
receiving a second request for feed from the client device of the target user;
determining a second feature vector comprising a feature specifying a time of day of the request;
providing the second feature vector to the model;
executing the model to determine a second video feed story rate for the second request;
generating a second feed in response to the second request, the generating comprising selecting a second set of feed stories for including in the generated feed, wherein the number of video feed stories included in the second set of feed stories is determined based on the second video feed story rate; and
sending the second feed to the client device of the target user.

16. The non-transitory computer-readable storage medium of claim 13, wherein the feature vector further comprises one or more features describing demographic attributes stored in the user profile of the user.

17. The non-transitory computer-readable storage medium of claim 16, wherein a demographic attribute is one of: age of the user, gender of the user, or a language associated with the user.

18. The non-transitory computer-readable storage medium of claim 13, wherein the feature vector further comprises one or more features describing a type of the client device.

19. The non-transitory computer-readable storage medium of claim 13, wherein the feature vector further comprises a feature representing an estimate of a number of video feed stories that have not been provided to the user.

20. A computer system comprising:
a computer processor; and
a non-transitory computer-readable storage medium comprising stored instructions for:
receiving a request for feed from a client device of a target user, wherein a feed represents a sequence of feed stories, each feed story comprising one or more of text, image, or video, wherein a video feed story represents a feed story with a video;

determining a feature vector comprising at least a feature specifying a time of day of the request;

providing the feature vector as input to a model configured to determine a video feed story rate indicating a rate at which video feed stories are included in a particular feed provided to the client device of the target user;

executing the model to determine the video feed story rate for the received request;

generating a feed in response to the received request, the generating comprising selecting a set of feed stories for including in the generated feed, wherein the number of video feed stories included in the set of feed stories is determined based on the video feed story rate; and sending the generated feed to the client device of the target user.

\* \* \* \* \*